United States Patent
Louchet-Pouillerie et al.

(10) Patent No.: US 8,137,826 B2
(45) Date of Patent: Mar. 20, 2012

(54) COMPOSITE MATERIAL PART WITH A SILICON-CONTAINING CERAMIC MATRIX PROTECTED AGAINST CORROSION

(75) Inventors: Caroline Louchet-Pouillerie, Arsac (FR); Henri Tawil, Le Bouscat (FR); Eric Bouillon, Talence (FR)

(73) Assignee: Snecma Propulsion Solide, Le Haillan (FR)

( * ) Notice: Subject to any disclaimer, the term of this patent is extended or adjusted under 35 U.S.C. 154(b) by 295 days.

(21) Appl. No.: 12/447,789

(22) PCT Filed: Dec. 6, 2007

(86) PCT No.: PCT/FR2007/052447
§ 371 (c)(1),
(2), (4) Date: Apr. 29, 2009

(87) PCT Pub. No.: WO2008/078024
PCT Pub. Date: Jul. 3, 2008

(65) Prior Publication Data
US 2010/0003504 A1    Jan. 7, 2010

(30) Foreign Application Priority Data
Dec. 18, 2006   (FR) .................... 06 55578

(51) Int. Cl.
| | |
|---|---|
| *B32B 17/10* | (2006.01) |
| *B32B 9/04* | (2006.01) |
| *B32B 13/04* | (2006.01) |
| *B32B 9/00* | (2006.01) |
| *B32B 19/00* | (2006.01) |
| *C23C 16/00* | (2006.01) |
| *C23C 8/00* | (2006.01) |
| *C23C 8/54* | (2006.01) |
| *B05D 1/36* | (2006.01) |
| *B05D 7/00* | (2006.01) |

(52) U.S. Cl. ........ 428/701; 428/334; 428/446; 428/698; 428/699; 427/255.394; 427/419.2; 427/419.7; 427/585; 427/590

(58) Field of Classification Search .................. 428/698, 428/702, 334, 446, 699, 701; 427/255.394, 427/419.2, 419.7, 585, 590
See application file for complete search history.

(56) References Cited

U.S. PATENT DOCUMENTS

| | | | |
|---|---|---|---|
| 6,607,852 B2 * | 8/2003 | Spitsberg et al. | 428/702 |
| 6,787,195 B2 | 9/2004 | Wang et al. | |
| 2005/0164027 A1 * | 7/2005 | Lau et al. | 428/632 |

FOREIGN PATENT DOCUMENTS

EP    0310043 A2    4/1989

OTHER PUBLICATIONS

Meng et al., "<0001>-oriented growth of AlN films on Si(111) by microwave plasma CVD with AlBr3—NH3—N2 system", Journal of Crystal Growth, vol. 163, No. 3, 1996, pp. 232-237.*

(Continued)

*Primary Examiner* — Jonathan Langman
(74) *Attorney, Agent, or Firm* — Weingarten, Schurgin, Gagnebin & Lebovici LLP

(57) ABSTRACT

An environmental barrier for a substrate of ceramic matrix composite material containing silicon, in particular containing SiC, is formed by an anticorrosion protection layer containing an aluminosilicate type compound of an alkali or alkaline-earth or rare earth element, e.g. BSAS, with a chemical barrier forming layer of aluminum nitride being interposed between the substrate and the anticorrosion protection layer.

20 Claims, 2 Drawing Sheets

OTHER PUBLICATIONS

Lee et al., "Current Status of environmental barrier coatings for Si-Based Ceramics", Surface and Coatings Technology, vol. 133-134, 2000, pp. 1-7.*

Armas et al., "Low-pressure Chemical Vapor deposition of mullite layers using cold-wall reactor", Surface and Coatings Technology, vol. 141, 2001, pp. 88-95.*

* cited by examiner ns with a matrix constituted at least in part by silicon carbide (SiC). A particular field of application of the invention is that of parts for hot portions of gas turbines, such as combustion chamber walls, turbine rings, or turbine nozzles, for aeroengines or for industrial turbines.

COMPOSITE MATERIAL PART WITH A SILICON-CONTAINING CERAMIC MATRIX PROTECTED AGAINST CORROSION

BACKGROUND OF THE INVENTION

The present invention relates to providing corrosion protection to ceramic matrix composite (CMC) material parts that contain silicon, in particular CMC material parts with a matrix constituted at least in part by silicon carbide (SiC). A particular field of application of the invention is that of parts for hot portions of gas turbines, such as combustion chamber walls, turbine rings, or turbine nozzles, for aeroengines or for industrial turbines.

For such gas turbines, the desire to improve efficiency and to reduce polluting emissions leads to envisaging ever higher temperatures in the combustion chambers.

Proposals have therefore been made to replace metal materials by CMC materials, in particular for the walls of combustion chambers or for turbine rings. CMC materials are known to possess both mechanical properties that enable them to be used for structural elements and also the ability to conserve those properties at high temperatures. CMC materials comprise fiber reinforcement made of refractory fibers, typically carbon or ceramic fibers, and densified with a ceramic matrix, typically made of SiC.

In a corrosive atmosphere (oxidizing atmosphere, in particular in the presence of moisture and/or in a saline atmosphere) and when CMC materials with an SiC matrix are used a phenomenon of the surface retreating is observed, because the silica ($SiO_2$) that forms by oxidation on the surface of the CMC material is volatilized.

It has been recommended that an environmental barrier should be formed on the surface of the CMC material. In one such known barrier for an SiC matrix CMC material substrate, the anticorrosion function is provided by a layer made of an aluminosilicate type compound of an alkaline-earth metal, such as the compound $BaO_{0.75}.SrO_{0.25}.Al_2O_3(SiO_2)_2$, commonly known by the abbreviation BSAS. A mixed chemically barrier layer formed by a mixture of BSAS and mullite is interposed between the substrate and the anticorrosion layer in order to avoid chemical interactions between the BSAS of the anticorrosion layer and the silica formed by oxidation of the final SiC layer of the substrate. A silicon layer is formed on the substrate to enable the mixed mullite plus BSAS chemical layer to adhere. Such an environmental barrier is shown very diagrammatically in FIG. 1 and is described in particular in U.S. Pat. Nos. 6,866,897 and 6,787,195. Introducing a minority quantity of BSAS in the mixed chemical barrier layer serves to reduce significantly the sensitivity of this layer to cracking, in comparison with a chemical barrier layer formed by mullite alone. The various layers are typically formed by physical deposition, in particular by thermal plasma deposition.

Satisfactory behavior for that environmental barrier has been observed at temperatures as high as about 1200° C., but significant degradation is observed when the temperature exceeds 1300° C. It is found that at around 1310° C. chemical interaction occurs between the BSAS of the mixed chemical barrier layer and the silica formed by oxidation the silicon bonding layer, thereby leading to very rapid separation of the environmental barrier. It has also been found that the internal stresses induced by the differences in thermal behavior between the layers of the environmental barrier make the silicon bonding layer particularly sensitive to cracking.

In French patent application 06/51180, the Applicant has proposed replacing the silicon bonding layer by a layer presenting a composition gradient between pure silicon at the substrate and mullite in contact with the mixed chemical barrier layer, as shown very diagrammatically in FIG. 2. Such a composition gradient enables internal stresses of thermal origin to be accommodated, and consequently significantly reduces the sensitivity to cracking of the inner portion made of pure silicon and the outer portion made of pure mullite. The mullite can then perform its chemical barrier function effectively, in spite of being of limited thickness, and satisfactory use becomes possible above 1300° C.

Nevertheless, that leads to an increase in the number of deposits making up the environmental barrier. The fabrication process is thus lengthened. In addition, the total thickness becomes considerable, particularly since the anticorrosion layer is sensitive to a phenomenon of its surface retreating due to the silica it contains volatilizing, which phenomenon cannot be compensated other than by increasing its thickness.

OBJECT AND SUMMARY OF THE INVENTION

The invention seeks to propose a method of forming an environmental barrier on a CMC material substrate containing silicon while using a limited number of component layers, while presenting good behavior in durable manner in a corrosive atmosphere at temperatures exceeding 1300° C.

This object is achieved by a method comprising forming an anticorrosion protection layer containing an aluminosilicate type compound of an alkali or alkaline-earth or rare earth element, in which method a chemical barrier forming layer of aluminum nitride is interposed between the substrate and the anticorrosion protection layer.

Advantageously, the aluminum nitride layer is formed directly on the substrate and the anticorrosion protection layer is formed directly on the aluminum nitride layer.

Remarkably, the Applicant has discovered that a single layer of aluminum nitride (AlN) between the CMC substrate having a silicon-containing matrix and an anticorrosion protection layer of BSAS type, for example, serves both to provide bonding between the environmental barrier and the substrate, and also to perform the chemical barrier function between the substrate and the anticorrosion layer, while also having a coefficient of thermal expansion that is close to the coefficient of thermal expansion of the substrate and of the anticorrosion layer, thereby avoiding generating strong internal stresses that lead to cracking.

The AlN layer needs to be sufficiently thick to enable it to perform its chemical barrier function, but there is nevertheless no need for this layer to be very thick. The thickness of the AlN layer preferably lies in the range 10 micrometers (μm) to 100 μm, approximately. It is thus possible to obtain a significant margin for increasing the thickness of the anticorrosion layer in order to compensate for the retreat due to the silica it contains volatilizing, and without that giving rise to significant increases in thickness and total weight when compared with prior art environmental barriers having numerous layers.

The simplification of the structure with an AlN layer of limited thickness between the substrate and the anticorrosion protection layer is also particularly advantageous when an additional outer layer is formed on the anticorrosion protection layer, the total thickness and weight of the coating being capable of remaining within reasonable limits. By way of example, such an outer layer may be a thermal barrier layer or a layer of abradable material for an application to a turbine ring in a gas turbine.

The AlN layer may be deposited using various techniques. The AlN layer is preferably formed by a chemical vapor deposition (CVD) process making it possible to form a regular layer of relatively small and well-controlled thickness, in particular by a plasma-enhanced CVD process.

The invention also provides a part comprising a composite material substrate with a ceramic matrix containing silicon and an environmental barrier formed on the substrate and comprising an anticorrosion protection layer containing an aluminosilicate type compound of an alkali or alkaline-earth or rare-earth element, in which barrier a layer of aluminum nitride is interposed between the substrate and the anticorrosion protection layer.

Advantageously, the aluminum nitride layer is formed directly on the substrate and the anticorrosion protection layer is formed directly on the aluminum nitride layer.

Also advantageously, the layer of aluminum nitride is of thickness lying in the range 10 µm to 100 µm, approximately.

The invention seeks in particular to protect CMC substrates in which at least an outer phase of the matrix of the composite material comprises silicon carbide or a ternary silicon-boron-carbon system.

In an embodiment, the anticorrosion protection layer is a barium and strontium aluminosilicate or BSAS.

The invention also provides parts having an environmental barrier obtained in accordance with the invention, in particular components for hot portions of gas turbines, in particular aeroengines or industrial turbines.

Said parts may also be provided with an outer layer forming a thermal barrier, e.g. made of alumina, zirconia, or yttrium-stabilized zirconia, or forming an abradable coating, e.g. for a turbine ring in a gas turbine.

BRIEF DESCRIPTION OF THE DRAWINGS

The invention can be better understood on reading the following description given by way of non-limiting indication with reference to the accompanying drawings, in which.

DETAILED DESCRIPTION OF EMBODIMENTS

Figure 1:
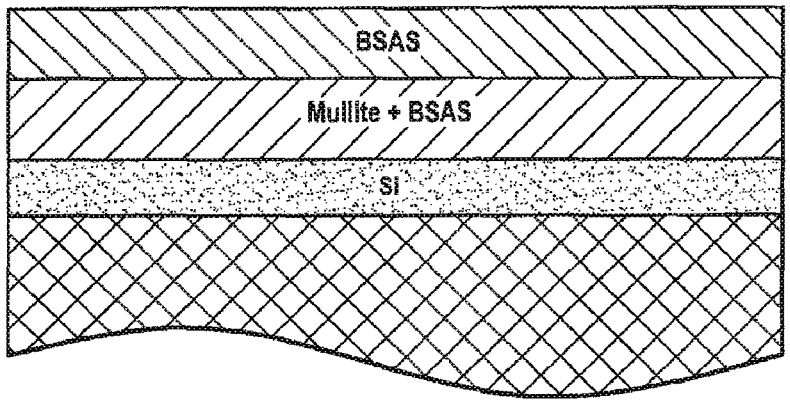
FIGS. 1 and 2, described above, are highly diagrammatic section views of prior art embodiments of environmental barriers.
Figure 2:
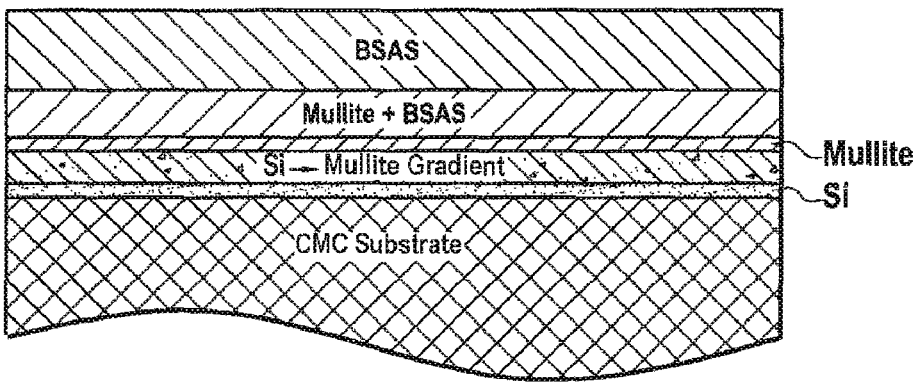
Figure 3:
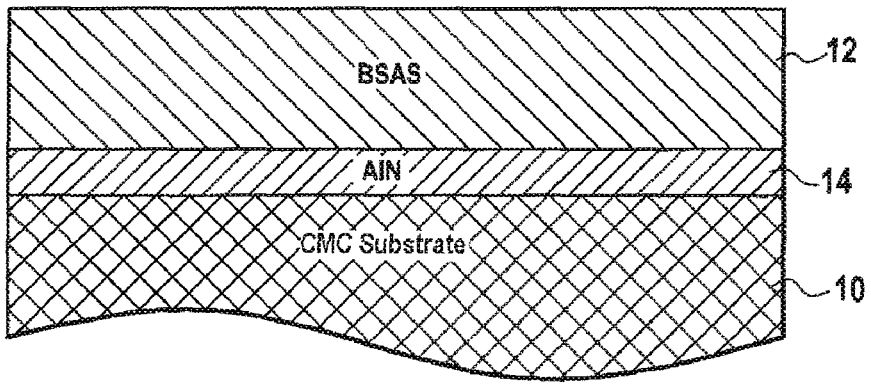
FIG. 3 is a highly diagrammatic section view of a CMC material part containing silicon provided with an environmental barrier constituting an embodiment of the invention.

FIG. 3 is a highly diagrammatic view of a substrate 10 provided with an environmental barrier constituting an embodiment of the present invention.

The substrate 10 is made of a silicon-containing CMC material. The fiber reinforcement of the CMC material may be made of carbon fibers (C) or of ceramic fibers, in particular SiC fibers. The SiC fibers may be coated in a thin interphase layer of pyrolytic carbon (PyC) or of boron nitride (BN), in well-known manner. In an outer matrix phase the matrix of the CMC material is constituted by a compound of Si, in particular SiC or a ternary Si—B—C system, either throughout or at least in part. The term "outer matrix phase" is used to mean a matrix phase that is last-formed, being furthest away from the reinforcing fibers. Under such circumstances, the matrix may be formed by a plurality of phases presenting different natures, e.g.:

a mixed C—SiC matrix (SiC being on the outside); or
a sequenced matrix with alternating matrix phases of SiC and matrix phases of lesser stiffness, for example of pyrolytic carbon (PyC), boron nitride (BN), or boron-doped carbon (BC), with a terminal phase of the matrix being made of SiC; or
a self-healing matrix with matrix phases of boron carbide ($B_4C$) or of a ternary Si—B—C system, possibly with free carbon ($B_4C+C$, Si—B—C+C), and with a terminal phase made of Si—B—C or of SiC.

Such CMC materials are described in particular in U.S. Pat. Nos. 5,246,736, 5,965,266, 6,291,058, and 6,068,930.

The environmental barrier comprises an anticorrosion protection layer 12 and a layer of AlN 14 forming a chemical barrier between the substrate 10 and the layer 12.

In this embodiment, the anticorrosion protection layer 12 is an aluminosilicate type compound of an alkali or alkaline-earth element, such as BSAS. Other compounds could be envisaged such as $CaO.Al_2O_3.(SiO_2)$ or CAS, $(MgO)_2.(Al_2O_3)_2.(SiO_2)_5$ or MAS, $BaO.Al_2O_3.SiO_2$ or BAS, $SrO.Al_2O_3.SiO_2$ or SAS, $35BaO.15CaO.5Al_2O_3.10B_2O_3.35SiO_2$ or BCAS, or indeed aluminosilicates of elements selected from rare earths, all of which are designated herein by "aluminosilicate type compounds of alkali, alkaline-earth, or rare-earth elements".

The AlN layer 14 constitutes a chemical barrier that opposes reaction between the silicon and the substrate 10 and the compound of the anticorrosion protection layer 12. The thickness of the AlN layer preferably lies in the range 10 µm to 100 µm approximately, a greater thickness not providing any significant improvement for the chemical barrier function.

The limited thickness of the AlN layer, and the fact that it may advantageously constitute a single intermediate layer between the substrate 10 and the anticorrosion protection layer 12, means that the protection layer may be given a relatively high thickness without any major drawback in terms of weight. The thickness of the layer 12 may thus be much greater than 100 µm, for example it may be as much as 400 µm or even more, thereby making it possible for it to have a lifetime that is long in spite of retreatment due to the silica it contains being volatilized at temperatures higher than about 1300° C.

Furthermore, the AlN layer 14 performs an additional function of bonding the environmental barrier onto the substrate 10.

The AlN layer 14 also presents a coefficient of expansion that is close to the coefficient of expansion of the materials that typically constitute the ceramic matrix of the substrate (in particular SiC) and the aluminosilicate type layer 12 (in particular BSAS), thereby limiting any risk of cracking as a result of internal stresses of thermal origin.

Thus, with a simple structure, the anticorrosion function of the layer 12 is preserved, i.e. the substrate is protected from high temperatures (that may exceed 1300° C.) in a corrosive atmosphere (moist) under high pressures, conditions to which components of gas turbines are exposed in particular, such as the walls of a combustion chamber or turbine nozzles or turbine rings, in particular for aeroengines.

The AlN layer 14 is advantageously deposited by chemical vapor deposition (CVD), and in particular by a plasma-enhanced CVD process (PE-CVD). The use of a CVD process enables a regular layer of well-controlled thickness to be formed. CVD type processes enabling an AlN deposit to be formed are well known. Use can be made of a reactive gas that contains aluminum chloride and ammonia gas. Other deposition processes can nevertheless be envisaged, in particular physical vapor deposition (PVD) processes.

PVD type processes or plasma projection deposition processes can be used for forming the anticorrosion protection layer 12. Deposition from powders in suspension in a liquid could also be envisaged for the layer 12.

In certain applications, an outer layer may be formed on the anticorrosion protection layer 12. Such an outer layer may be constituted, for example, by a thermal barrier layer, e.g. of alumina, zirconia, or yttrium-stabilized zirconia, or by a layer of abradable material, particularly for application to turbine rings in gas turbines.

Example

Test pieces or substrates of CMC material were made by forming multilayer fiber reinforcement out of SiC fibers as sold by the Japanese supplier Nippon Carbon under the name "Hi-Nicalon", and by densifying the fiber reinforcement with an SiC matrix obtained by chemical vapor infiltration (CVI). A method of forming such a material with CVI deposition of a thin interphase layer of PyC between the fibers and the matrix is well known.

An AlN layer having thickness of about 30 μm was deposited by plasma-assisted CVD onto the CMC material test pieces, enabling a layer of uniform composition to be formed that adhered well to the substrate.

A BSAS layer having a thickness of about 150 μm was then formed by thermal plasma, thereby obtaining a layer that adhered well to the AlN layer.

Annealing heat treatment under air at about 1300° C. was then performed to transform the BSAS layer into the celsian crystalline form that presents good structural stability and a coefficient of expansion close to that of the substrate. Nevertheless, it should be observed that such heat treatment is optional.

A test of ability to withstand thermal shocks was then performed on a test piece E1 provided with the environmental barrier, the test being constituted by five cycles comprising insertion into an oven at 1200° C. and return to ambient temperature. After these thermal shocks, it was found that the adhesion of the environmental barrier on the CMC material was well conserved, as shown in FIGS. 4 and 5, at two different scales.

Figures 4, 5:
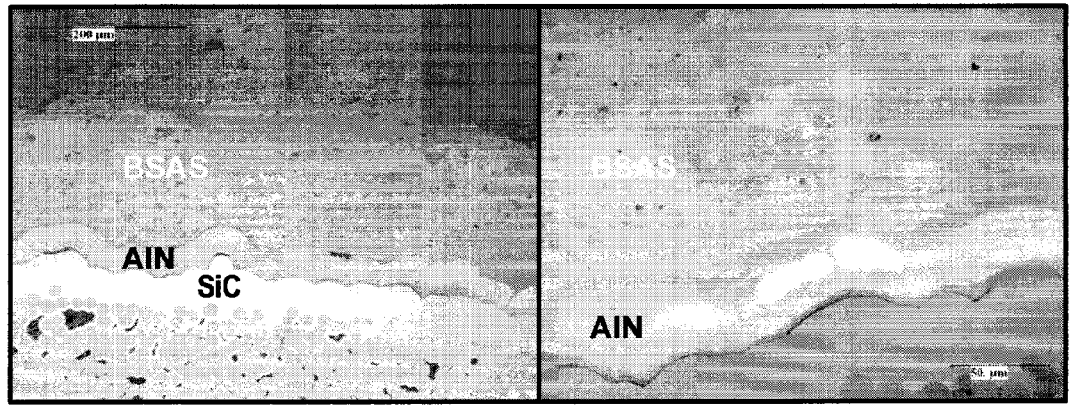
FIGS. 4 and 5 are microphotographs of sections of a CMC material test piece provided with an environmental barrier in an embodiment of the invention that has been subjected to thermal shocks.

In FIGS. 4 and 5, the AlN layer is anchored on the SiC film (or "seal coat") formed during the process of densifying the CMC test piece in continuity with the SiC matrix.

Figures 6, 7:
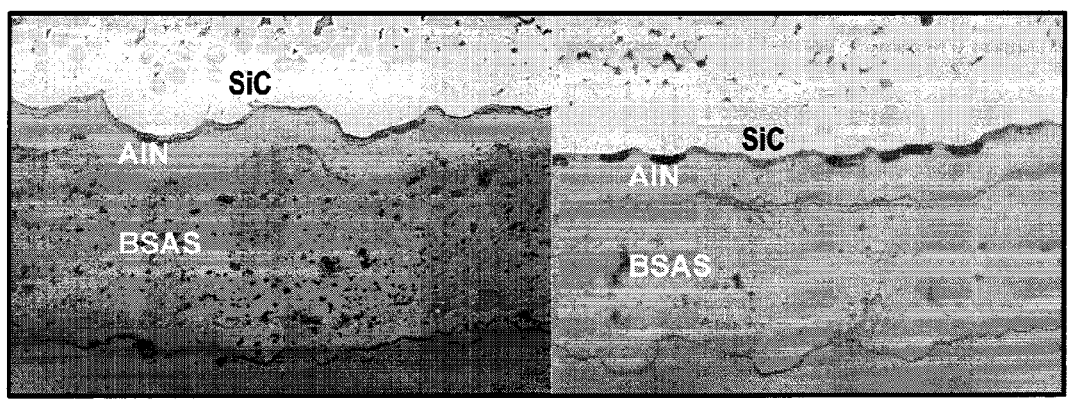
FIGS. 6 and 7 are microphotographs of sections of CMC material test pieces provided with an environmental barrier constituting an embodiment of the invention and after being subjected to a corrosive atmosphere.

Two other test pieces E2 and E3 obtained after annealing heat treatment were subjected to corrosion treatments by being exposed under a wet atmosphere (45% air and 65% steam) respectively for 500 hours (h) at 1200° C. and for 120 h at 1400° C. FIGS. 6 and 7 relate to the test pieces E2 and E3 respectively, and they show that the entire environmental barrier was well conserved at such temperature levels in a corrosive atmosphere.

The invention claimed is:

1. A method of forming an environmental barrier on a substrate of ceramic matrix composite material containing silicon, the method comprising forming an anticorrosion protection layer of an aluminosilicate type compound of an alkali or alkaline-earth or rare earth element, the method being characterized in that a chemical barrier forming layer of aluminum nitride is interposed between the substrate and the anticorrosion protection layer, wherein the aluminum nitride layer is formed directly on the substrate and the anti-corrosion layer is formed directly on the aluminum nitride layer, and wherein the anti-corrosion layer is formed of an aluminosilicate compound of an alkali, alkaline earth, or rare-earth element.

2. A method according to claim 1, characterized in that the aluminum nitride layer is formed having a thickness lying in the range 10 μm to 100 μm, approximately.

3. A method according to claim 1, characterized in that the aluminum nitride layer is formed by a chemical vapor deposition process.

4. A method according to claim 1, characterized in that the aluminum nitride layer is formed by a plasma-enhanced chemical vapor deposition process.

5. A method according to claim 1, characterized in that:
the aluminum nitride layer is formed having a thickness lying in the range 10 μm to 100 μm, approximately;
the aluminum nitride layer is formed by a chemical vapor deposition process.

6. A part comprising a composite material substrate with a ceramic matrix containing silicon and an environmental barrier formed on the substrate and comprising an anticorrosion protection layer containing an aluminosilicate type compound of an alkali or alkaline-earth or rare-earth element, the part being characterized in that a layer of aluminum nitride is interposed between the substrate and the anticorrosion protection layer, wherein the aluminum nitride layer is formed directly on the substrate and the anti-corrosion layer is formed directly on the aluminum nitride layer, and wherein the anti-corrosion layer is formed of an aluminosilicate compound of an alkali, alkaline earth, or rare-earth element.

7. A part according to claim 6, characterized in that the layer of aluminum nitride is of thickness lying in the range 10 μm to 100 μm, approximately.

8. A component for the hot portion of an industrial or aviation gas turbine, the component being constituted by a part according to claim 7.

9. A component according to claim 8 forming a turbine ring, and characterized in that it is also provided with an outer layer of abradable material.

10. A part according to claim 6, characterized in that at least one outer phase of the composite material matrix comprises silicon carbide or a ternary silicon-boron-carbon system.

11. A part according to claim 6, characterized in that the anticorrosion protection layer is a barium and strontium aluminosilicate (BSAS).

12. A part according to claim 11, characterized in that it is also provided with an outer layer forming a thermal barrier.

13. A component for the hot portion of an industrial or aviation gas turbine, the component being constituted by a part according to claim 6.

14. A component according to claim 13 forming a turbine ring, and characterized in that it is also provided with an outer layer of abradable material.

15. A part according to claim 6, characterized in that:
the layer of aluminum nitride is of thickness lying in the range 10 μm to 100 μm, approximately;
at least one outer phase of the composite material matrix comprises silicon carbide or a ternary silicon-boron-carbon system;
the anticorrosion protection layer is a barium and strontium aluminosilicate (BSAS).

16. A part according to claim 15, characterized in that it is also provided with an outer layer forming a thermal barrier.

17. A component for the hot portion of an industrial or aviation gas turbine, the component being constituted by a part according to claim 16.

18. A component according to claim 17 forming a turbine ring, and characterized in that it is also provided with an outer layer of abradable material.

19. A component for the hot portion of an industrial or aviation gas turbine, the component being constituted by a part according to claim 15.

20. A component according to claim 19 forming a turbine ring, and characterized in that it is also provided with an outer layer of abradable material.

* * * * *